United States Patent Office 2,953,479
Patented Sept. 20, 1960

2,953,479

WATERPROOFING PROCESS AND THE ARTICLE PRODUCED THEREBY

Rudi Heyden, Dusseldorf, and Hans Wedell, Dusseldorf-Holthausen, Germany, assignors to Böhme Fettchemie G.m.b.H., Dusseldorf, Germany, a corporation of Germany No Drawing. Filed Dec. 5, 1956, Ser. No. 626,322

Claims priority, application Germany Dec. 7, 1955

9 Claims. (Cl. 117—135.5)

This invention relates to a waterproofing process, and more particularly to a method of waterproofing various types of materials with the aid of aqueous solutions of organic complex compounds of polyvalent metals.

Copending application Serial No. 621,008, filed November 8, 1956, now U.S. Patent No. 2,885,417, discloses that by reacting solutions of basic salts of polyvalent metals in low-molecular weight alcohols with acid phosphoric acid esters of high-molecular weight hydroxyl compounds, alcohol solutions of organic complex compounds of these metal salts are obtained which may be diluted with water in any desired ratio. For example, organic metal complex compounds may be obtained by a reaction between basic aluminum salts or chromium salts dissolved in methanol or ethanol and acid phosphoric acid mono- or diesters of high-molecular weight hydroxyl compounds. Serial No. 621,008 discloses these compounds to be organic complex salts of a polyvalent metal containing a ratio of at least 2.5 mols of an alcohol-soluble, basic salt of a polyvalent metal selected from the group consisting of aluminum, chromium, iron, tin and titanium, for every one mol of an acid ester of phosphoric acid esterified with a high-molecular weight hydroxyl compound selected from the group consisting of aliphatic alcohols, fatty aromatic alcohols and cycloaliphatic aromatic alcohols, said hydroxyl compound having about 6 to about 18 carbon atoms in the molecule, and having co-ordinated with said basic salt and said acid ester a low-molecular weight alcohol selected from the group consisting of alkanols and alkane polyols. This application further discloses that complex salts formed by 3 or more mols of basic metal salt per mol of phosphoric acid ester are preferable for water miscibility and that the most advantageous molar ratio is 1 to 5 mols of basic metal salt per mol of phosphoric acid ester for formation of the complex salts in general, either water-miscible or water-immiscible.

We have found that these organic metal complex compounds, for example those of aluminum or chromium, may advantageously be employed for the production of water-repellent impregnations. For example, the organic metal complex compounds are excellently suitable for waterproofing such fibrous materials as textiles, furs and feathers, paper, cardboard, cellulose and wood; also for imparting water-repellent characteristics to such materials as fiberplates, synthetics, porous ceramic substances and metal surfaces; and, finally, also for waterproofing all types of coatings.

These impregnations very strongly reduce the wettability and the water-permeability of the objects treated therewith without imparting to the objects an unpleasant fatty feel or, in the case of textiles, a clammy feel. The absorption of the impregnating substance takes place very rapidly and leads to a relatively stable bond with the base material.

The above-named objects may be impregnated with the organic metal complex compounds in various manners; for example, by brushing, immersion, spraying or rolling. A particular advantage of this process over the known impregnating processes is that the impregnating composition does not have to be applied in the form of an emulsion. Instead, clear, colorless solutions may be used which produce no discoloration of any kind on the material treated.

As previously stated, the production of the organic metal complex salts used in the process according to the present invention is the subject matter of copending application Serial No. 621,008, filed November 8, 1956. The starting materials for the production of the organic complex metal salts are a basic inorganic or organic acid salt of a polyvalent metal, such as basic chromium chloride, basic aluminum nitrate, basic zirconium chloride, basic salts of titanium, zinc, etc., and a phosphoric acid ester, preferably an acid mono- or diester of orthophosphoric acid, such as mono- or dioctyl phosphoric acid ester, mono- or di-dodecyl phosphoric acid ester, mono- or dioleyl phosphoric acid ester, or acid phosphoric acid esters of other aliphatic, cycloaliphatic, fatty-aromatic or cycloaliphatic-aromatic hydroxyl compounds. The starting material may, however, also be an acid ester mixture such as is obtained, for example, by reaction of phosphorus pentoxide with high-molecular hydroxyl compounds. Suitable low-molecular weight alcohol solvents for the reaction are primarily methanol and ethanol. However, also other low-molecular weight monohydroxyl or polyhydroxyl alcohols may be used. In this manner solutions of the organic metal complex compounds in the low-molecular weight alcohols are obtained which may be diluted with water in any desired ratio; they are preferably used in this diluted form for the impregnation of the above-named materials in accordance with the present invention. The production of the above organic metal complex compounds is not limited to the above-named process; other methods of production may be employed, provided that soluble metal phosphoric acid ester complexes are formed thereby which have a cationic character. Such products are also obtained, for example, if the basic metal salts are reacted with the acid alkyl phosphates in the fused state.

Textile materials which may advantageously be impregnated with the complex metal compound solutions in accordance with the present invention are, for example, the following: linen, hemp, jute, cotton, staple fibers, rayon, silk, wool, fully synthetic fibers such as polyamide fibers and polyester fibers, polyacrylonitrile fibers, alginate fibers, and the like, in the form of fibers, threads, flakes, strands, fabrics, knitted fabrics, felts and so forth. Dyed or undyed textile materials may be employed. Despite the water-repellent effect produced on the textile materials by the treatment in accordance with the present invention, the fabrics, knitted fabrics or felts retain a sufficient degree of air-permeability. The organic metal complex compounds readily penetrate into the textile material and impart to it completely water-repellent properties and at the same time a pleasant, soft feel, without weakening or damaging the fiber itself. In addition, an anti-static and a delustering effect may be imparted to the fibers.

In general, solutions are used which contain from 0.2 to 10 gm. per liter of the metal complex compounds, but preferably from 0.5 to 3 gm. per liter. In some cases, it may be advantageous to add from 5 to 10 gm. per liter of a hydrolyzable salt of a polyvalent metal, such as zirconium, to the solution. The textiles are then impregnated in the usual manner—for example, in an open vat or on a reel—within a period of 10 to 30 minutes, but the impregnation may also be carried out in a padding machine. Subsequent to the impregnation treatment, the textile material is squeezed and then dried in the customary fashion at elevated temperatures.

The impregnation process may be suitably modified for waterproofing the other above-mentioned materials. For example, it is possible to produce an excellent water-repellent effect on paper, cardboard or cellulose, or on products produced from paper pulp, as well as on wall paper and packaging materials, with the aid of the above-described complex metal salt solutions.

A procedure analogous to the above-described textile treatment also leads to excellent waterproofing of furs and feathers. The treatment of porous surfaces or substances such as ceramic materials with the solutions according to the present invention produces a strongly reduced capability of such materials to soak up water, and the treatment of metal surfaces with these solutions produces good protection against moisture-corrosion and oxidizing conditions.

The following examples will further illustrate the present invention and enable others skilled in the art to understand it more completely, without limiting the invention to these particular examples.

EXAMPLE I

Production of a 75% basic aluminum chloride solution 241 parts aluminum chloride hexahydrate were dissolved in 1600 parts by weight methanol, and the solution was admixed with 90 parts by weight sodium hydroxide. The resulting mixture was boiled under reflux for 1–2 hours, at the end of which time the entire theoretical amount of sodium chloride had separated out. The sodium chloride was filtered off.

Production of the complex salt 170 parts by weight of the basic aluminum chloride solution obtained above were admixed with a solution of 9.1 parts by weight of the monophosphoric acid ester of coconut fatty alcohols having from 12–18 carbon atoms dissolved in 60 parts by weight methanol, and the resulting mixture was boiled under reflux for 1–2 hours. A water-miscible product was obtained which contained as its principal constituent a complex aluminum salt. The resulting solution contained 1.14% Al, 1.1% Cl, and 0.42% P corresponding to 3.8% acid phosphoric acid ester.

Waterproofing of cotton poplin material

A dense cotton poplin material was impregnated for 15 minutes at room temperature with an aqueous solution containing per liter 50 gm. of a 6.75% methyl alcohol solution of the complex aluminum salt obtained in accordance with the above procedure. Thereafter, the impregnated poplin material was squeezed between rollers until it had a residual moisture content of 76%. The material was finally dried in a stream of air at 100° C., which moved at moderate speeds. The cotton fabric treated in this manner was able to absorb only 24% by weight water, whereas it was able to absorb 88% by weight water prior to the treatment. The impregnation produced an excellent water-repellent effect. The treated fabric had a pleasant, soft feel.

EXAMPLE II

Production of 66% basic chromium chloride solution 66.5 parts by weight chromium (III) chloride hexahydrate were boiled with 485 parts by weight methanol and 20 parts by weight sodium hydroxide for 1–2 hours under reflux accompanied by stirring. At the end of this period 29.2 parts by weight sodium chloride had separated out, which were filtered off.

Production of the complex salt 270 parts by weight of the 66% basic chromium (III) chloride solution thus obtained were admixed with a solution of 10 parts by weight monotetradecyl phosphoric acid ester in 70 parts by weight methanol, and the mixture was boiled for 1–2 hours under reflux. At the end of this period the reaction mixture was completely soluble in water. The complex chromium salt consisting of about 1 mol monotetradecyl phosphoric acid ester and 3.7 mols of chromium salt was separated in the form of a concentrate containing 7.81% Cr, 5.25% Cl, and 1.25% P corresponding to 11.85% acid phosphoric acid ester, by distilling off a portion of the methanol solvent.

Waterproofing of spun rayon nettle fabric

A spun rayon nettle fabric which had previously been dyed green was impregnated in a padding machine with an aqueous solution containing per liter 20 gm. of a 50% methyl alcohol solution of the complex chromium salt obtained in accordance with the above procedure. Thereafter, the impregnated fabric was squeezed until it had a residual moisture content of 80% and dried at 100° C. After this waterproofing treatment the fabric not only exhibited good water-repellent characteristics but also a reduction in its capability to absorb water from 112% to 26% by weight.

EXAMPLE III

Production of 66% basic aluminum chloride solution 241 parts by weight aluminum chloride hexahydrate were boiled with 1600 parts by weight methanol and 80 parts by weight powdered sodium hydroxide under reflux for about 1–2 hours accompanied by stirring. At the end of this period approximately 105 parts by weight sodium chloride separated out, which were filtered off. The same result was obtained when 375 parts by weight aluminum nitrate nonahydrate were substituted for the aluminum chloride hexahydrate.

Production of the complex salt 180 parts by weight of the basic aluminum chloride solution thus obtained were slowly added to a boiling solution of 6.8 parts by weight of a phosphoric acid monoester with a fatty alcohol fraction having 12–18 carbon atoms dissolved in 50 parts by weight methanol; the phosphoric acid monoester was produced by hydrogenation of coconut fatty acid. The resulting mixture was then boiled under reflux for an additional 1–2 hours. At the end of this time it was miscible with water in any desired ratio. The same results were obtained when ethanol was substituted for methanol. After evaporating the methanol to dryness, a colorless organic aluminum complex salt remained behind which was not soluble in water but freely soluble in various organic solvents, such as methanol and other lower alkyl alcohols. Upon dissolution of the complex salt in methanol, the resulting solution was miscible with water in any desired ratio. The solution contained 1.19% Al, 1.54% Cl, and 0.32% P corresponding to 3.35% acid phosphoric acid ester.

Waterproofing of cotton apparel fabric

A cotton apparel fabric composed of fine cotton threads was impregnated with a solution of 10 gm. of the complex aluminum salt produced in accordance with the above procedure in 1 liter of carbon tetrachloride. Thereafter, the impregnated fabric was centrifuged to remove excess solution and dried at 60° C. The water-absorption capacity of the fabric was reduced from 88% to 26% by this treatment. In addition, the treated fabric exhibited excellent water-repellent characteristics and had a pleasant feel.

EXAMPLE IV

A mixed fabric composed of equal portions of Perlon and wool fibers was impregnated as described in Example II above. A water-repellent fabric was obtained which had a very small water-permeability and a smooth, flowing feel.

EXAMPLE V 38 parts by weight titanium tetrachloride were dissolved in 100 parts by weight ethanol while cooling. The resulting solution was diluted with 100 parts by weight methanol. The mixture thus obtained was heated to the boiling point and at that temperature was admixed with a solution of 16 parts by weight sodium hydroxide in 100 parts by weight methanol accompanied by stirring. After heating the mixture for about 5 hours, the sodium chloride precipitated thereby was filtered off. 152 parts by weight of this solution, containing about 50% basic titanium chloride, were then admixed with a boiling solution of 6.8 parts by weight of the monoalkyl phosphoric acid ester mixture comprising alkyl radicals with 12–18 carbon atoms in 50 parts by weight methanol. The precipitate which formed at first again dissolved after a short period of time. In all, the resulting mixture was heated for 10 hours at the boiling point accompanied by stirring. At the end of this period the small amount of precipitate remaining was filtered off. The solution thus obtained contained as its principal constituent a complex titanium salt.

25 gm. of a 10% methanol solution of a complex titanium salt which was prepared in accordance with the above procedure were distributed in 1 liter of water. An umbrella fabric of acetate silk was immersed in this solution and padded, thereafter squeezed to remove excess solution and dried at 80° C. The fabric treated in this manner exhibited a much reduced water-permeability and excellent water-repellent characteristics.

EXAMPLE VI

A dense cotton poplin fabric which had previously been dyed yellow was passed through a padding machine charged with various aqueous solutions which contained per liter 20, 30 and 50 gm., respectively, of a 10% methanol solution of a complex chromium salt produced from basic chromium chloride and the monophosphoric acid ester of octylphenol. After drying at 100° C., the fabric exhibited good water-repellent characteristics and a water-absorption capability determined by rain tests in accordance with Bundesmann, "Melliands Textilberichte," 1935, pages 128, 211, 331 and 792, as shown in the following table:

| Complex chromium salt content of solution | Water absorption capability, percent by weight |
|---|---|
| 5 gm./l | 18 |
| 3 gm./l | 21 |
| 2 gm./l | 25 |
| Untreated fabric | 104 |

EXAMPLE VII 133 parts by weight chromium (III) chloride were boiled with 800 parts by weight methanol and 20 parts by weight sodium hydroxide for 1–2 hours under reflux accompanied by stirring. Without separating the sodium chloride formed thereby, the 33% basic chromium chloride solution thus obtained was then admixed with 48.5 parts by weight of a technical alkyl phosphoric acid ester mixture comprising alkyl radicals with 12–18 carbon atoms dissolved in 200 parts by weight methanol, by adding the methanol solution to the chromium chloride solution dropwise. The alkyl phosphoric acid ester mixture was obtained by reacting a coconut fatty alcohol fraction having 12–18 carbon atoms in the alkyl chain with phosphorus pentoxide. The mixture was heated for an additional 1–2 hours accompanied by stirring. Thereafter, a portion of the methanol was distilled off, yielding a concentrated solution of a complex salt containing 1 mol of the alkyl phosphoric acid ester and 3 mols of the basic chromium salt. The concentrate was freed from precipitated sodium chloride by filtration. The methanol solution of the complex salt was miscible with water in any desired ratio and formed a clear solution.

In order to demonstrate the effectiveness of the waterproofing process according to the present invention, filter paper was immersed for 30 seconds into an aqueous solution which contained per liter 5 gm. of the 50% methanolic solution of a complex chromium salt produced in accordance with the above procedure. The impregnated filter paper was subsequently dried. The water-permeability of the treated paper was determined by placing the paper between two vertically disposed electrodes of which the upper electrode was a container with a perforated bottom. The upper electrode was placed on the paper surface with the perforated bottom touching the paper and was then filled with a 5% sodium chloride solution. The filter paper acted as an insulator until it was penetrated by the salt solution. The flow of current was determined by an ammeter. With the untreated filter paper, the penetration of the salt solution was complete within a fraction of a second. The paper treated in accordance with the above procedure, however, remained dry even after 24 hours.

EXAMPLE VIII

Brown wrapping paper was impregnated with the complex chromium salt solution described in Example VII above. The resulting paper was water-repellent and was successfully used for all purposes where a water-repellent wrapping material was needed.

EXAMPLE IX

Paper pulp was admixed in a pulping machine with an aqueous solution which contained per liter 0.5 gm. of a 50% methanol solution of the complex chromium salt produced in accordance with Example VII above, and the treated pulp was then worked up in the customary manner on an endless wire mesh. The paper obtained thereby exhibited high water-repellent characteristics.

While we have given certain specific embodiments of our invention for purposes of illustration, it will be apparent to persons skilled in the art that the invention is not limited to these particular examples and that various changes and modifications may be made without departing from the spirit of the invention or the scope of the appended claims.

We claim:

1. The process of waterproofing fibrous and porous materials, which comprises impregnating said materials with a solution consisting essentially of an inert liquid solvent medium having dissolved therein an organic complex salt of a polyvalent metal containing a ratio of at least 2.5 mols of an alcohol-soluble, basic salt of a polyvalent metal selected from the group consisting of aluminum, chromium, iron, tin, and titanium, for every one mol of an acid ester of phosphoric acid esterified with a high-molecular weight hydroxyl compound selected from the group consisting of aliphatic alcohols, fatty aromatic alcohols and cycloaliphatic aromatic alcohols said hydroxyl compound having about 6 to about 18 carbon atoms in the molecule, and having coordinated with said basic salt and said acid ester a low-molecular weight alcohol selected from the group consisting of alkanols and alkane polyols, and drying the impregnated materials.

2. An article having water-repellent properties produced by the process of claim 1.

3. The process of waterproofing fibrous and porous materials, which comprises impregnating said materials with a solution consisting essentially of an inert liquid solvent medium having dissolved therein an organic complex salt of aluminum containing a ratio of at least 2.5 mols of an alcohol-soluble basic salt of aluminum for every one mol of an acid phosphoric acid ester of a high-molecular weight hydroxyl compound having about six to about eighteen carbon atoms in the molecule selected from the group consisting of aliphatic alcohols, fatty aromatic alcohols and cycloaliphatic aromatic alcohols and having methanol coordinated with said basic aluminum salt and said acid ester, and drying the impregnated materials.

4. The process of waterproofing fibrous and porous materials, which comprises impregnating said materials with a solution consisting essentially of an inert liquid solvent medium having dissolved therein an organic complex salt of chromium containing a ratio of at least 2.5 mols of an alcohol-soluble basic salt of chromium for every one mol of an acid phosphoric acid ester of a high-molecular weight hydroxyl compound having about six to about eighteen carbon atoms in the molecule selected from the group consisting of aliphatic alcohols, fatty aromatic alcohols and cycloaliphatic aromatic alcohols and having methanol coordinated with said basic chromium salt and said acid ester, and drying the impregnated materials.

5. The process of waterproofing fibrous and porous materials, which comprises impregnating said materials with a solution consisting essentially of water, methyl alcohol and an organic complex aluminum salt containing a ratio of about 3 mols to about 5 mols of an alcohol-soluble basic aluminum chloride for every one mol of a monophosphoric acid ester of coconut fatty alcohols having from 12 to 18 carbon atoms in the molecule, and having methanol coordinated with said basic aluminum chloride and said acid ester, and drying the impregnated materials.

6. The process of waterproofing fibrous and porous materials, which comprises impregnating said materials with a solution consisting essentially of water, methyl alcohol and an organic complex chromium salt containing a ratio of about 3 mols to about 5 mols of an alcohol-soluble basic chromium chloride for every one mol of a monotetradecyl phosphoric acid ester and having methanol coordinated with said basic chromium chloride and said acid ester, and drying the impregnated materials.

7. The process of waterproofing fibrous and porous materials, which comprises impregnating said materials with a solution consisting essentially of carbon tetrachloride and an organic complex aluminum salt containing a ratio of about 3 mols to about 5 mols of an alcohol-soluble basic aluminum chloride for every one mol of a phosphoric acid monoester of a fatty alcohol fraction having 12 to 18 carbon atoms in the molecule and having methanol coordinated with said basic aluminum chloride and said acid monoester, and drying the impregnated materials.

8. The process of waterproofing fibrous and porous materials, which comprises impregnating said materials with a solution consisting essentially of water, methanol, ethanol and an organic complex titanium salt, containing a ratio of about 3 mols to about 5 mols of an alcohol-soluble basic titanium chloride for every one mol of a phosphoric acid monoalkyl ester mixture having alkyl radicals with 12 to 18 carbon atoms and having a mixture of methanol and ethanol coordinated with said basic titanium chloride and said acid ester, and drying the impregnated materials.

9. The process of waterproofing fibrous and porous materials, which comprises impregnating said materials with a solution consisting essentially of water, methanol and an organic complex chromium salt containing a ratio of about 3 mols to about 5 mols of an alcohol-soluble basic chromium chloride for every one mol of a monophosphoric acid ester of octyl phenol and having methanol coordinated with said basic chromium chloride and said acid ester, and drying the impregnated materials.

References Cited in the file of this patent

UNITED STATES PATENTS

| | | |
|---|---|---|
| 2,329,707 | Farrington et al. | Sept. 21, 1943 |
| 2,823,144 | Dalton | Feb. 11, 1958 |
| 2,885,417 | Heyden | May 5, 1959 |